J. M. ROHRER.
DIRIGIBLE HEADLIGHT.
APPLICATION FILED AUG. 2, 1920.
1,398,802.
Patented Nov. 29, 1921.
2 SHEETS—SHEET 2.
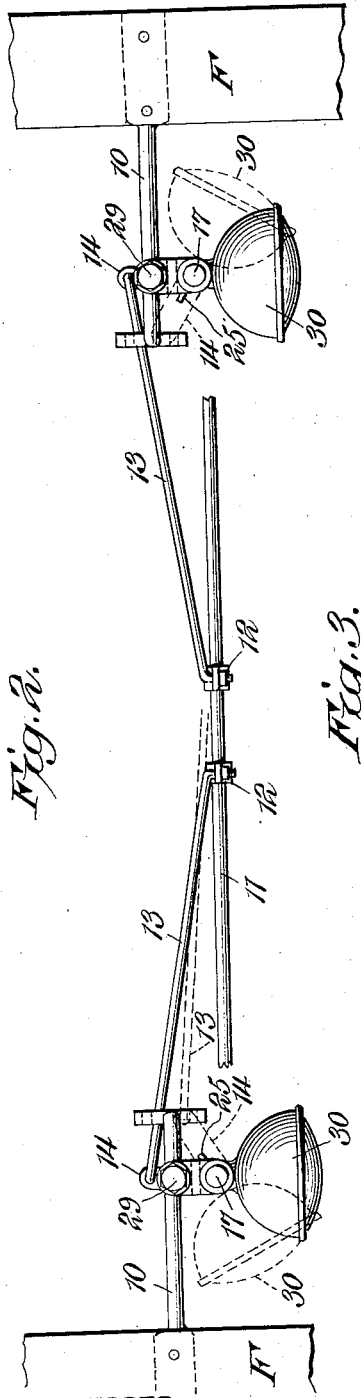
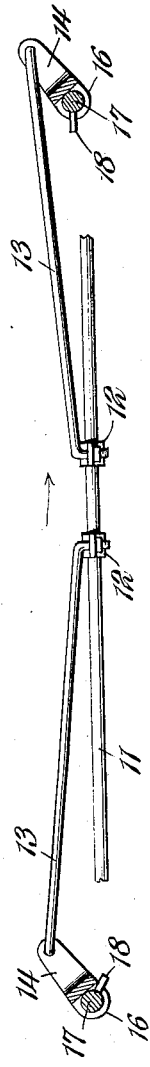
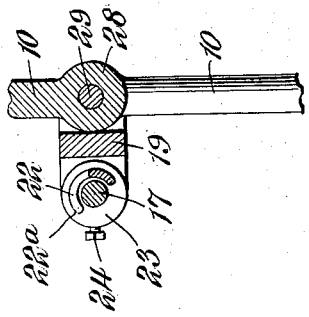
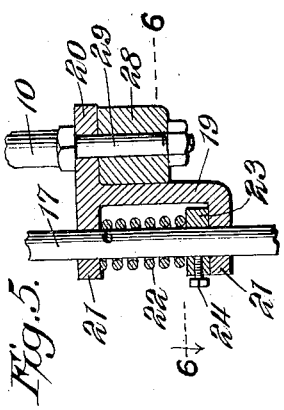
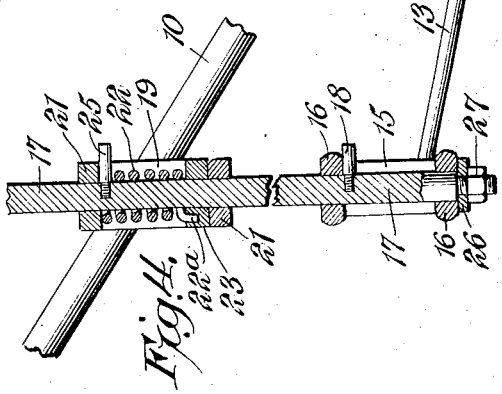
WITNESSES
Howard D. Orr.
Philip E. Siggers
John M. Rohrer, INVENTOR,
BY E. G. Siggers
ATTORNEY

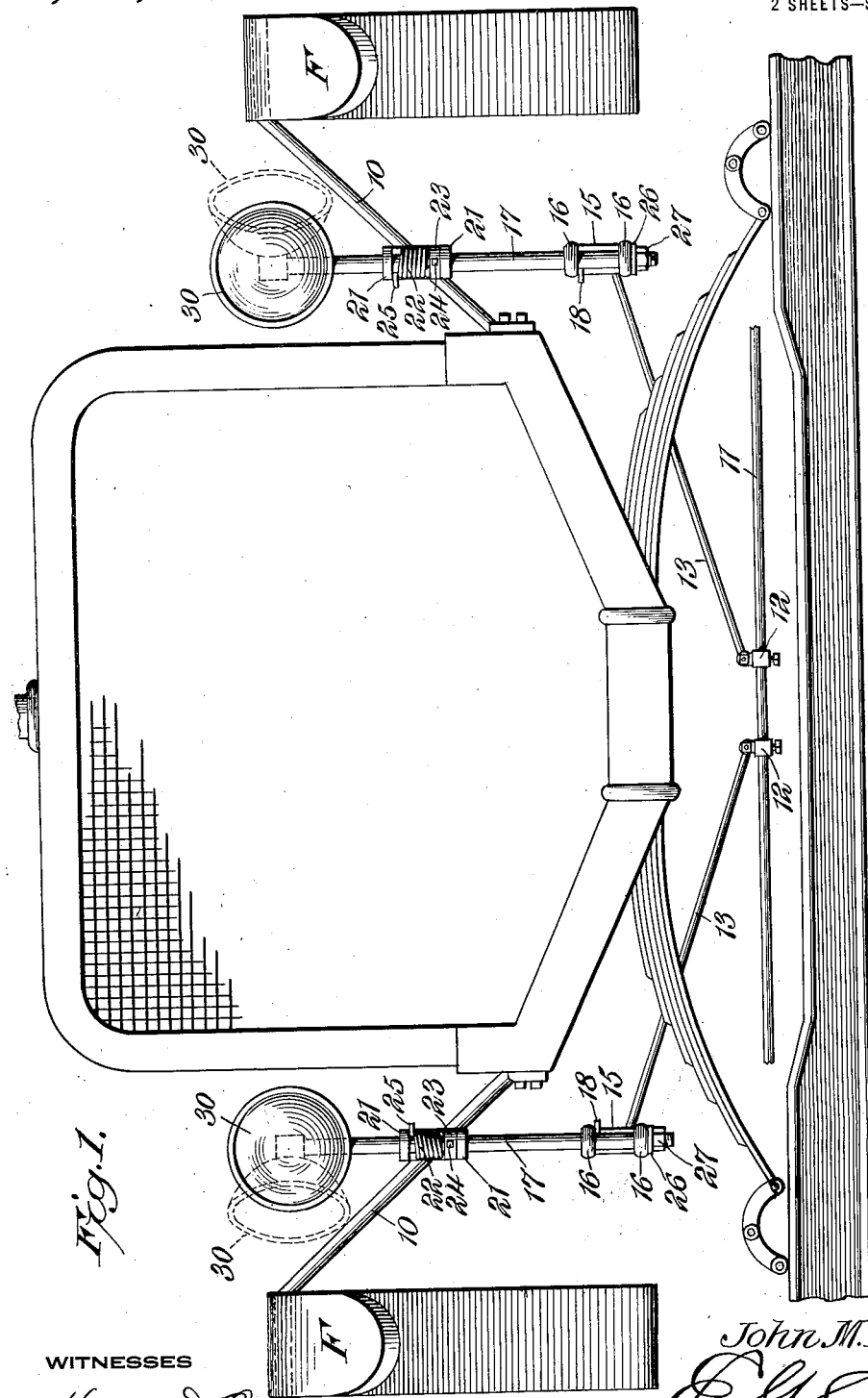

UNITED STATES PATENT OFFICE.

JOHN M. ROHRER, OF ORWIGSBURG, PENNSYLVANIA.

DIRIGIBLE HEADLIGHT.

1,398,802.  Specification of Letters Patent.  Patented Nov. 29, 1921.

Application filed August 2, 1920. Serial No. 400,750.

*To all whom it may concern:*

Be it known that I, JOHN M. ROHRER, a citizen of the United States, residing at Orwigsburg, in the county of Schuylkill and State of Pennsylvania, have invented a new and useful Dirigible Headlight, of which the following is a specification.

This invention relates to dirigible headlights.

The object of the invention is to provide an improved construction whereby steering of the front wheels of an automobile effects turning of that lamp on the side toward which the turn is being made while maintaining the opposite lamp in fixed position.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Figure 1 is a front elevation of the device of the present invention shown installed upon an automobile, only so much of the latter being shown as is necessary for an understanding of the invention.

Fig. 2 is a top plan view showing the connections between the steering rod and the lamp and omitting the body of the automobile.

Fig. 3 is a detail plan view showing the position of the steering rod and link connections when moved in the direction indicated by the arrowhead.

Fig. 4 is a detailed vertical cross section showing the mechanism by which the lamps are turnable in one direction but not in the other.

Fig. 5 is a view similar to Fig. 4 but taken at right angles thereto.

Fig. 6 is a detail horizontal cross section taken substantially on the line 6—6 of Fig. 5.

The numeral 10 designates brackets which are attached at their lower ends to the body of the automobile and at their upper ends support the front fenders F. These brackets also support the front lamps of the automobile, as will be described below. The brackets 10 may be taken as indicative of any of the various means for supporting the front lamps or headlights of an automobile, and it is not necessary that the lamp supports have either the form or the position illustrated in the drawings. The invention is entirely independent of any particular form of headlight support. 11 indicates the steering rod of the automobile whose end connections have been omitted from the drawing as they are not essential to an understanding of the invention. Mounted upon the steering rod 11 near the center thereof is a pair of connecting devices 12 secured by set screws or in any other desirable mechanical way upon the rod 11. Each of the connecting devices has a pivotal connection with a link 13 in turn pivotally connected to the end of a crank arm 14 provided on a block 15. Since the construction for each lamp mounting is precisely the same, a description of one will suffice for both. The block has a pair of integral ears 16 having alined bores to receive a rod 17, which rod supports a headlight at its upper end. The rod 17 may turn within the ears 16 upon its own axis, or more accurately speaking, the block 15 may be turned about the rod 17 as an axis. A stud 18 is secured in the rod 17 between the ears 16 and projects outwardly therefrom. When the block 15 is turned upon the rod 17 in one direction, it will engage with the stud 18, as shown at the left in Fig. 3. Thus one rod 17 will be turned, carrying with it the lamp. The other rod 17 on the opposite side of the machine will not be turned, as is indicated at the right hand side in Fig. 3.

The lower end of rod 17 is screw-threaded as shown in Figs. 4 and 5, and a washer 26 and nut 27 are provided on the rod so as to hold the block 15 upon the rod. The connection of the link 13 with the crank arm 14 serves to hold the block 15 on the lower end of the rod 17. The lamp supporting rod is of any convenient length and is supported intermediate its ends by means mounted upon the bracket 10. A casting 19 is provided with integral ears 21, said ears having perforations therethrough to admit the rod 17. Mounted in surrounding relation to the rod 17 between the ears 21 is a torsional spring 22. The lower end of this spring 22ᵃ is secured in any desirable way to a collar 23 made fast by a set screw 24 or equivalent means upon the rod 17. The upper end of the torsional spring 22 is secured to the upper ear 21. Thus the spring 22 may be made to impart to the rod 17 a torsional movement so that the rod 17 tends to turn within the ears 21 in a given direction. Each rod 17 carries a stop pin 25 secured in projecting relation thereto between the ears 21 and normally abutted against the side wall of the casting 19, as shown in Fig. 4. The stop pin 25 prevents the torsional spring from turning the rod 17 whereby the lamp on the upper end of the rod would move inwardly relative to the vehicle. On the other hand, the stop pin 25 does not prevent turning of the lamp-supporting rod 17 in such a direction that the lamp is moved outwardly relative to the machine. An outturned position of the lamps is indicated in Figs. 1 and 2.

It should be clear from the foregoing description that movement of the steering rod will cause movement of both links 13 and therefore turning of both blocks 15. However, movement of the steering rod to the right, as viewed in Fig. 3, will move only the left hand lamp supporting rod 17. Movement of the steering rod 11 to the left will move only the lamp on the right. When the block 15 engages with the pin 18 to cause the lamp-supporting rod 17 to turn, the pin 25 turns with the rod. When the block 15 is swung back to the original position, the torsional effect of the spring 22 will cause the rod 17 to follow the block 15 until the stop pin 25 comes in contact with the side of the castings 19. The stop pins prevent inward turning of the lamps, either under the influence of the springs or by reason of the turning of the steering mechanism.

The casting 19 also has an integral ear 20 which provides a support for the block, said ear having a bore for receiving a bolt 29 also passing through an enlargement 28 provided on the bracket 10. The part 28 provides a fixed support for the casting 19. The casting in turn supports the collar 23, which, being fast to the rod 17, prevents downward movement of said rod. At the upper end of each rod 17 a headlight 30 is mounted.

Instead of a bracket 10 with an enlargement 28 supporting the rod 17, the fender itself may have the casting 19 mounted thereon. The shape of the casting 19 will therefore vary with the make of the automobile to which the device of the invention is attached, and the form of casting 19 illustrated in the drawing is therefore not to be taken as limiting the invention, which is independent of any particular form of such casting. The present invention is believed to reside in the connections between the steering rod and lamp-supporting rod, in the means for causing return of the lamps to the straight-ahead position after displacement, and in the means by which one of the lamps is turned outwardly at a time while the other lamp is positively prevented from inward turning.

What is claimed is:—

1. In dirigible headlight construction for automobiles, a link pivotally secured at one end upon the steering rod of the car, a rod vertically supported on the car to turn on its longitudinal axis, a lamp secured to the upper end of said rod, a block mounted on the lower end of said rod and having a crank arm projecting therefrom, said link being pivotally connected to the outer end of said crank arm, ears projecting outwardly from the block and provided with alined openings, the lamp-supporting rod being turnable within said alined opening, a stud secured to the lamp-supporting rod and engaged by said block when the latter is swung in one direction by movement of the steering rod, a torsional spring imparting to the rod a tendency to move in a direction opposite to that in which it is moved by the link, and stop means provided on the rod and engageable with the support thereof to prevent turning of the rod under the influence of the spring beyond a predetermined position.

2. In dirigible headlight construction for automobiles, a link pivotally connected at one end to the steering rod of the car, a lamp-supporting rod held in vertical position to oscillate on its own axis, a block mounted on the lower end of said rod and turnable thereon, said link being pivotally connected with said block, a stud secured to the rod in the path of said block and moved in one direction whereby the rod is turned with the block, a support for the rod mounted upon the car, a torsional spring surrounding the rod and fixed at its upper end to said support, a collar clamped to said rod and connected to the lower end of said spring, said collar aiding in the support of said rod, and stop means secured to the rod and engageable with the support thereof to prevent turning of the rod under the influence of the spring beyond a predetermined position.

In testimony that I claim the foregoing as my own, I have hereto affixed my signature.

JOHN M. ROHRER.